Oct. 15, 1968  A. H. CARMACK ET AL  3,405,615
AUTOMATICALLY JUSTIFYING PHOTOTYPOGRAPHIC APPARATUS
Filed Jan. 31, 1964  10 Sheets-Sheet 10
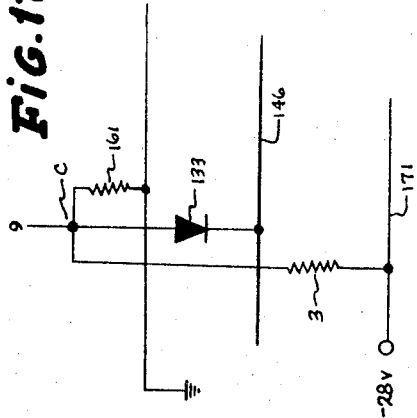
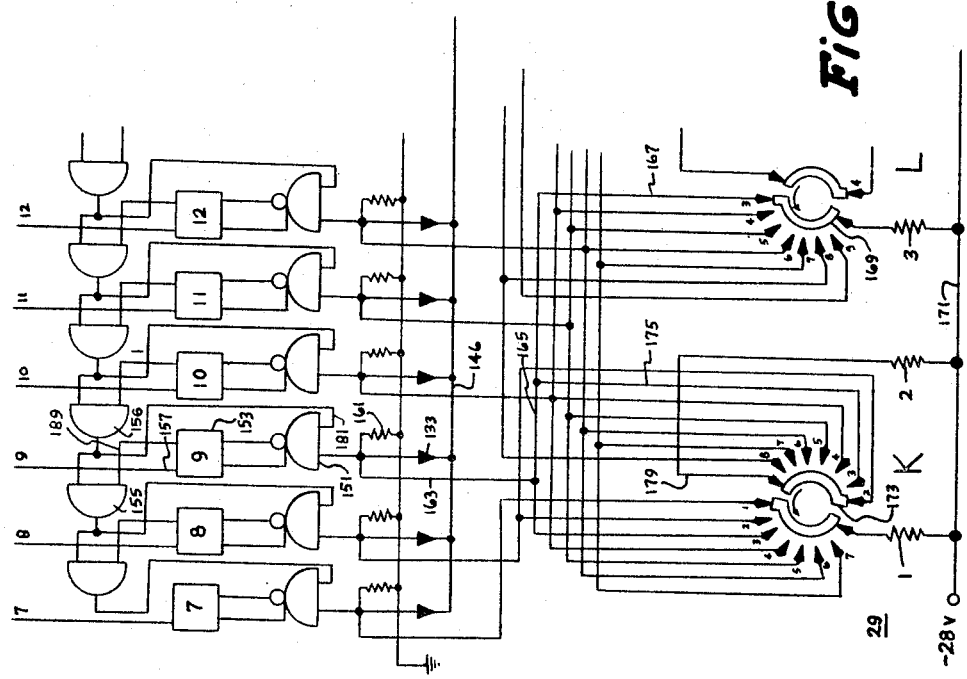
INVENTORS
Allen H. Carmack
Jon H. De Frees
BY Fisher, Christen, Sabol & Caldwell
ATTORNEY

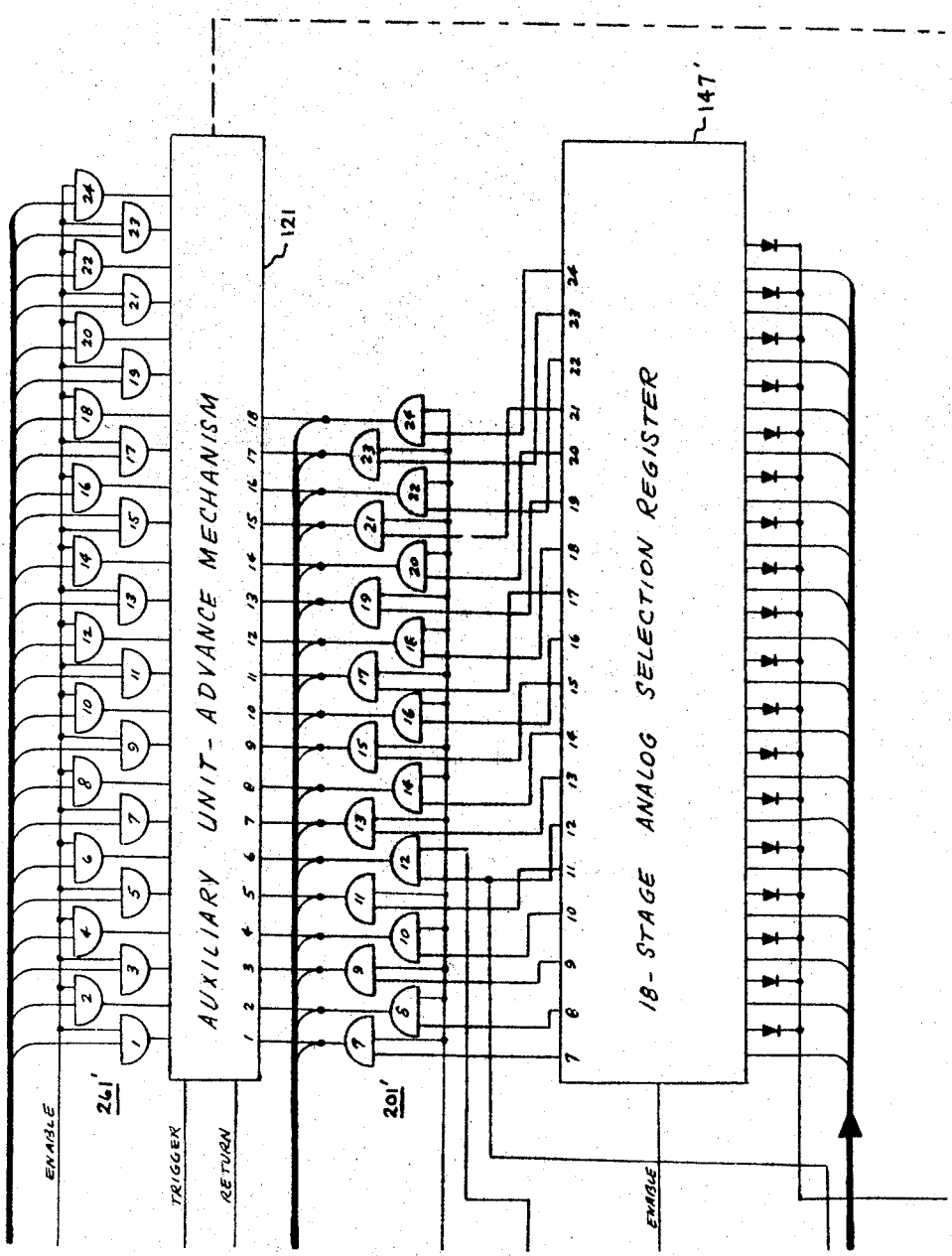

3,405,615
**AUTOMATICALLY JUSTIFYING PHOTO-
TYPOGRAPHIC APPARATUS**
Allen H. Carmack and Jon W. De Frees, both of 352
Mt. Pleasant Drive, Woodbridge, Va. 22191
Filed Jan. 31, 1964, Ser. No. 341,567
6 Claims. (Cl. 95—4.5)

This invention relates generally to phototypographic apparatus by which printing plates used in photolithographic printing are produced. More specifically, the invention relates to an integrated construction for a line and column justification mechanism.

The justification mechanism of the present invention will be described as a modification to the phototypographic apparatus disclosed and claimed in the co-pending joint application of Allen H. Carmack and Jon W. De Frees, Ser. No. 220,836, which was filed in the United States Patent Office on Aug. 31, 1962, and which is pending in Group 430.

In phototypographic apparatus of the aforesaid character the composite, from which the printing plate is made, is produced by successively projecting the individual characters, letters and/or symbols, of a copy onto a photographic film of either paper or plastic, in a predetermined arrangement.

The photographic arrangement, per se, as shown herein comprises generally a holder which is adapted to have a photographic medium removably mounted therein. A rotating disk is mounted adjacent the holder in operative relation thereto. The rotating disk is provided with an annular row of printing images including characters, letters and symbols, adjacent the periphery thereof. A character image projecting means comprising a photographic lens and a light source, which are mounted in fixed position in axial alignment with the image row of the disk, is provided for projecting the image of a selected character from the rotating disk onto the medium, such as a film in the holder. A translating means which is operative, after the projection of a character image onto the film, to change the relative position of the film and the character image projecting means with respect to each other, is also provided.

The rotating disk is further provided with a plurality of radially spaced concentric annular rows of character code windows, and a plurality of radially spaced, concentric, annular rows of character spacing code windows.

A stationary mounting structure supports a plurality of fixed light sensitive or responsive devices, such as photoelectric cells which are both annularly and radially spaced with respect to each other, and each of which is adapted to align with one of the concentric character code rows of the rotating disk. The stationary mounting structure is also provided with a plurality of fixed light sensitive or responsive devices which are also both angularly and radially spaced with respect to each other, and each of which is adapted to align with one of the character spacing code rows of the rapidly rotating disk.

A light source and a focusing lens are mounted in fixed position in axial alignment with each of the character code and character spacing code windows, with the light sources and focusing lenses being disposed on one side of the rotating disk, and the photoelectric cells being disposed on the other side thereof.

As previously stated, the rotary disk is constantly rapidly rotated during operation. During rotation thereof successive character control windows in each annular row of character control windows disposed in the rotary disk will successively register with the associated character code photoelectric cells. Each time a character code window registers with a photoelectric cell, light from the associated light source will be projected through the aligned window against the cell, thereby causing the cell to emit a pulse which is amplified and applied to a comparator decoder.

Also during rotation of the rotary disk, successive character spacing code windows in each annular row of character spacing code windows disposed in the rotary disk will successively register with their associated photoelectric cells. And each time a character spacing window registers with an auxiliary character spacing photoelectric cell, light from the associated light source is projected through the registering window, against the cell, thereby causing the cell to emit a pulse which is amplified and applied to the translating mechanism, and is also utilized for tabulation purposes by the incorporated justification apparatus.

The character code windows disposed in the rotary disk are so arranged with respect to each other and with respect to their associated photoelectric cells that a unique combination of cells will be energized as a result of window alignment, such that an individual code is generated for each character, each being a multi-bit code.

The character spacing code windows in the various annular rows or character spacing code windows in the rotary disk are so arranged with respect to each other and to the photocells therefor that only a single character spacing code window and a single cell are in register at any one time, each comprising a unique single bit code.

From this it will be apparent that a plurality of character code pulses will be simultaneously generated, and that only a single character spacing code pulse will be generated.

The codes on the disk are so arranged relative to the character images that the character and character spacing codes for a selected character are always generated simultaneously with the registration of the selected character on the rotating disk with the character projection window. The code sensing photoelectric cells are disposed at stationary locations in alignment with every row of the disk and distributed to correspond with each possible bit location for an image and spacing code of any character in the photographic exposure position.

The photographic function and the translating mechanism are rendered operative by an electronic mechanism which provides a sequence of character and spacing codes corresponding to a line of copy previously set by an associated encoding keyboard or other composition recording device.

Each time the key for any selected character is depressed it effects the generation of the same character code as that generated from the action of the rotary disk for the like character. These selected codes are first recorded or stored in a magnetic memory device from which they are subsequently applied to a comparator decoder where they are compared with the codes applied thereto from the disk generator. Only when the selected character on the rotating disk is in register with the character projection window will a code match occur to cause the comparator decoder to emit an actuating pulse to render the photographic function effective to project the selected character onto the film in the film holder. At the same time the comparator decoder imparts an actuating pulse to the translating means which effects a change in the relative positions of the character image projecting means and the film in accordance with the unit spacing code for the selected character imparted to the translating means from the disk code generating mechanism. The foregoing operation is repeated for each successively generated character code from the memory.

The magnetic memory device may comprise two similar magnetic drums each of which has a combined recording, read out and erasing head operatively associated therewith.

Each time a key for a selected character is depressed it actuates a predetermined combination of a plurality of micro switches in accordance with the pulse code for the selected character. The actuation of the predetermined combination of switches causes a pulse generator and amplifier to generate the requisite code signal pulses and impart them to one or the other of the magnetic memory drums through a switching unit which is operative to alternately connect one of the drums to the pulse generator to be recorded by keyboard action while connecting the other drum to the comparator decoder for reading out its previously recorded contents.

The magnetic drums are adapted to be intermittently advanced step-by-step after each code signal imparted thereto until the code signals for an entire line of copy have been stored, after which the drum is adapted to be returned to initial position and connected to the comparator decoder. While the code signals for one line of copy are being recorded on one of the drums the code signals for another line of copy, which were previously recorded on the other of the drums, are being imparted to the comparator decoder through a read-back pulse amplifier. After all of the code signals on a drum have been read out and imparted to the comparator decoder, the drum is returned to its initial position and again connected to the pulse generator.

A re-set or end-of-line signal key is also provided on the keyboard which is operative to effect the initiation of a switching action, as above mentioned, provided the code signals for one line of copy have been recorded on one of the magnetic drums, and the code signals previously recorded on the other of the drums have been read out and imparted to the comparator decoder.

In response to a re-set signal the comparator decoder imparts an actuating pulse to the translating mechanism which effects relative elevating of the film a predetermined amount. In further response to a re-set signal the comparator decoder also imparts an actuating pulse to the magnetic memory device which is operative to effect the actuation of the alternating switch unit to reverse the connection of the two magnetic drums with respect to the pulse generator and comparator decoder, and to return the drum, from which the code signals have just been read out, and imparted to the comparator decoder to initial position, ready for the recording of new code signals thereon and the reading out of the code signals just recorded on the other drum.

Each line of copy typed and projected onto the film must occupy or extend from end to end of a predetermined length of space on the film with the beginning and ending of successive lines being disposed in vertical alignment, disregarding the provisions, to be described, for handling partial lines. The predetermined length is determined by the operator prior to typing. The width of characters and the spacing between characters is fixed in accordance with the type of characters being used. This spacing of the characters upon the film is determined by the character spacing code, for the particular type of characters used, which is generated from the character spacing code windows provided for the particular type of characters used. It is understood that the arrangement of character spacing code windows in the rotary disk is changed in accordance with the different types of characters used, as by substituting disks.

Assuming that when a typed line of copy is projected onto the film in accordance with the generated code signals for the particular type of characters used, it would fail to extend the full predetermined length of the line, apparatus must be provided for increasing the length of the line on the film. Since the width of the characters and the spacing between characters is fixed, other arrangements must be provided for extending the length of the line projected onto the film. This is done by proportionately increasing the spacing between the various words of a line projected onto the film. For this purpose a line-by-line column justification apparatus is incorporated to modify the inter-word spacing to cause each line of copy to fill the predetermined length, and is operative in a manner compatible with the system inter-component control, both during record and readout cycles, i.e. its input and output, respectively.

Basically, justification is established as a result of the tabulation of spacing values which take into account not only the individual spacing unit value for each selected character, but also a standard predetermined inter-word spacing value, predetermined as an integral number of character spacing units. In addition to the tabulator, a counter provides a measure of the number of between-word-spacings occurring at any time up to the extent of the composed line. Since the operator predetermines the total number of unit spacings available per line, the continuous tabulation provides a measure (difference) of the remaining available spaces for the line under compilation. The counter output and the tabulator are inter-related to the "remainder" number (difference magnitude) such that the value contained in the latter is divided by the count in the former to provide a quotient in the form of a number of spaces which must be added to each inter-word spacing to consume the remaining spaces in the line. This quotient is utilized in connection with the photographic reproduction of the characters comprising the line to control the inter-word spacing, by incrementally adding to each between-word-spacing a proportionate share of the remainder so as to justify the line.

The invention adapts a linear potentiometer and associated circuitry to serve as the tabulator for the unit spacing values, a stepping switch serving as the counter for the number of between-word-spacings. By connecting the two in a parallel arrangement, division of a voltage proportional to the remaining spaces and the number of between-word occurrences is performed to provide the quotient on a continuously available basis. In the event two memory sections are provided, similar arrangements are associated with each section in order to facilitate the speed of operation of the subject apparatus by permitting a record cycle to be carried on simultaneously with a readout cycle.

Each such associated potentiometer comprises a resistance winding and a pair of take off wipers or sliders. One of the wipers is adjustably mounted on a line length gauge which is fixed adjacent the keyboard, and is adapted to be set in position thereon in accordance with the desired length and ending of a typed line on the film. The other wiper is permanently connected to the associated unit advancing means and is adapted to be intermittently advanced by the unit space advancing means from the zero position on the resistance winding toward the fixed wiper until a complete line of copy has been typed on the keyboard. The two wipers are connected in electrical parallel to an associated stepping switch (counter).

Each time a character key on the keyboard is depressed it effects the advancing of the movable wiper along the resistance winding toward the fixed wiper a distance which is equal to the voltage equivalent of the spacing allotted to the selected character. Each time the keyboard spacer bar is actuated it effects the movement of the movable wiper toward the fixed wiper a distance equal to the voltage equivalent of the nominal between-word-spacing which is usually about six space units, and simultaneously causes the stepping switch counter to step one increment.

Let it be assumed that one volt is the equivalent of one space unit, that the movable slider is at zero position on the resistor and that the fixed slider is set at the 150 volt position on the resistor, and that at the end of the typing of a line of copy on the keyboard the movable slider has been advanced to the 140 volt position on the resistor. There is, therefore, a difference of 10 volts between the two sliders, which voltage difference is imparted to the stepping switch. Based on the assumption that one volt is the equivalent of one space unit, the ten volt difference between the two sliders indicates that the line of copy just typed on the keyboard would fall 10 space units short of the desired length of line on the film if it were projected onto film in accordance with only the nominal between-word-spacing. The justification apparatus is, therefore, operative to proportionately increase the spacing between the words of the line of copy just typed, in accordance with the 10 volt difference between the two sliders and impart the resultant word spacing to the film translating means. Based on the further assumption that the line of copy typed contained six words and five between-word-spaces, the justification apparatus would cause each of these five between-word-spaces to be increased by two space units each.

In connection with the foregoing, it should be borne in mind that a line of copy typed on the keyboard is first recorded on one of the memory drums to be subsequently utilized during the readout cycle (i.e. when projecting the images onto the film) and that the described incremental movement of the movable slider along the resistor occurs during the recording of a typed line of copy on one of the drums of the memory device. Then as a recorded line of copy is read out from a drum and imparted to the main comparator decoder, the justification apparatus imparts the computed additional word spacing units to the translating means, to be added to the nominal spacing units between words.

A consideration of the method employed for the incorporated justification will readily make it apparent for the incorporated justification will readily make it apparent that the apparatus may be operated effectively with a single memory unit or alternatively at a somewhat higher speed through the use of two similar memories. When two memories are used, a great deal of circuitry duplication is included because such circuitry remains for permanent association with each memory section; therefore, it is a simple matter to switch one memory from the record to the readout cycle while the other memory is simultaneously switched from the readout to its record cycle.

Thus, while a disadvantage of the single memory arrangement lies in the fact that the operator must pause at the end of each line for a few seconds to permit the transfer of the justified line to film, nevertheless it will be appreciated that a considerably less expensive machine is available. Such a machine, even with the inherent delay at the end of each line, incorporates sufficient improvements over the commercially available machines in compactness, inexpensiveness and simplicity of operation as to warrant its inclusion at many small business establishments. Alternatively, the apparatus incorporating two memory sections poses no delay for the operator at any time, and thus offers maximum utility and speed of composition.

Thus, a unique method is provided wherein a photographic record of a justified composition of selectable printing characters is created on a medium through the steps of providing a source of available character images, the codes for such images existing along with spacing codes for each character image. The input composition for the apparatus is provided in the form of character codes sequentially produced as the characters are selected and, of course, between-word-spacing signals similarly produced between the words made up by the selected characters. The selected character codes are stored as well as compared for a code match from the source of codes, which match simultaneously affords a measure of the spacing of the matched character. This spacing measure is tabulated for the successive characters comprising the line. Also, the between-word-spaces are counted as they occur and the latter count or tabulation is divided into the former tabulation to obtain a measure of the incremental spacing to be added to each between-word-spacing to justify the line, through controlling the relative displacement of the medium and images of the characters being photographed thereon by adding-in the calculated increment between the words.

When a single memory section is employed, the line of characters is stored as it is composed and the justification quotient is developed such that upon the initiation of an end-of-line signal the stored information is used to develop a justified photograph of the line while the operator waits. Employing a two-section memory, the operator never waits because while the aforementioned process is being carried out, the operator is loading the other section of the memory with the successive line of information, at the end of which all inter-connections are reversed and the cycle repeats itself, thereby permitting the record and readout cycles to take place simultaneously for the respective memory drums.

Among the objects of the invention are the following:

It is an important object of this invention to provide a new and improved line and column justification mechanism which is especially adapted for incorporation in a phototypographic apparatus.

Another object of the invention is to provide a justification mechanism of the aforesaid character which is responsive to the operation of a keyboard or other source of selected characters and is entirely automatic in operation.

Another object of the invention is to provide a line and column justification mechanism, for a phototypographic apparatus, which is entirely electronic, is relatively simple, and is small and compact.

A further object of the invention is the provision of a novel method for effecting photocomposition with automatic justification.

A still further object of the invention is the provision of such a method and apparatus capable of continuously providing a justification quotient as each line is compiled such that the quotient will be available to justify any of various remaining spaces among the inter-word gaps.

It is a further and significant object of the invention to provide phototypographic apparatus of a type wherein the elements are inter-connected for functional inter-action in chain fashion to avoid complex synchronization arrangements and yet incorporate automatic justification.

It is another object of the invention to provide a unique photographic composition method and apparatus with justification provision, but without requirement for extraneous synchronization or timing apparatus.

Yet another object of the invention is the provision of a phototypographic composition arrangement wherein character code matching is utilized to simultaneously develop character spacing tabulation and to further use a match condition to effect photographing of the character image on a medium.

Another object of the invention is the provision of a unique justifying apparatus of a type capable of continuously tabulating character and between-word-spacing and dividing the total thereof by a continuous tabulation of the number of between-word-spacings to provide a measure of incremental spacing to be incorporated between words for justification.

Further, it is another object of the invention to provide circuitry capable of analog-to-incremental conversion for selecting, in terms of space units, any one of a plurality of different electrical values corresponding to the developed quotient, and lastly;

It is another object of this invention to provide additional capabilities to permit, during the readout, the positioning of a partial line or a single word flush with the extreme right or left sides of the predetermined line length, or to be centered between the ends of the line.

Having stated the principal objects of the invention, other and further objects will become apparent to those skilled in the art from the following detailed description of the invention when viewed in the light of the accompanying drawing forming a part hereof, in which;

FIGS. 1–9 show a preferred arrangement in schematic block form of apparatus in accordance with the present invention and wherein the nine (9) sheets are adapted to be assembled with the upper row (from left to right) constituting FIGS. 7, 8 and 9; the row therebeneath comprising FIGS. 4, 5 and 6 (from left to right); and the bottom row (also from left to right) including FIGS. 1, 2 and 3.

FIG. 10 is a circuit schematic arrangement illustrating in greater detail the expand function which provides letter-spacing capability and an adaptability to hyphenless justification techniques, and;

FIG. 11 is a circuit diagram taken from FIG. 10 for the purpose of explanation thereof.

Figure 2:
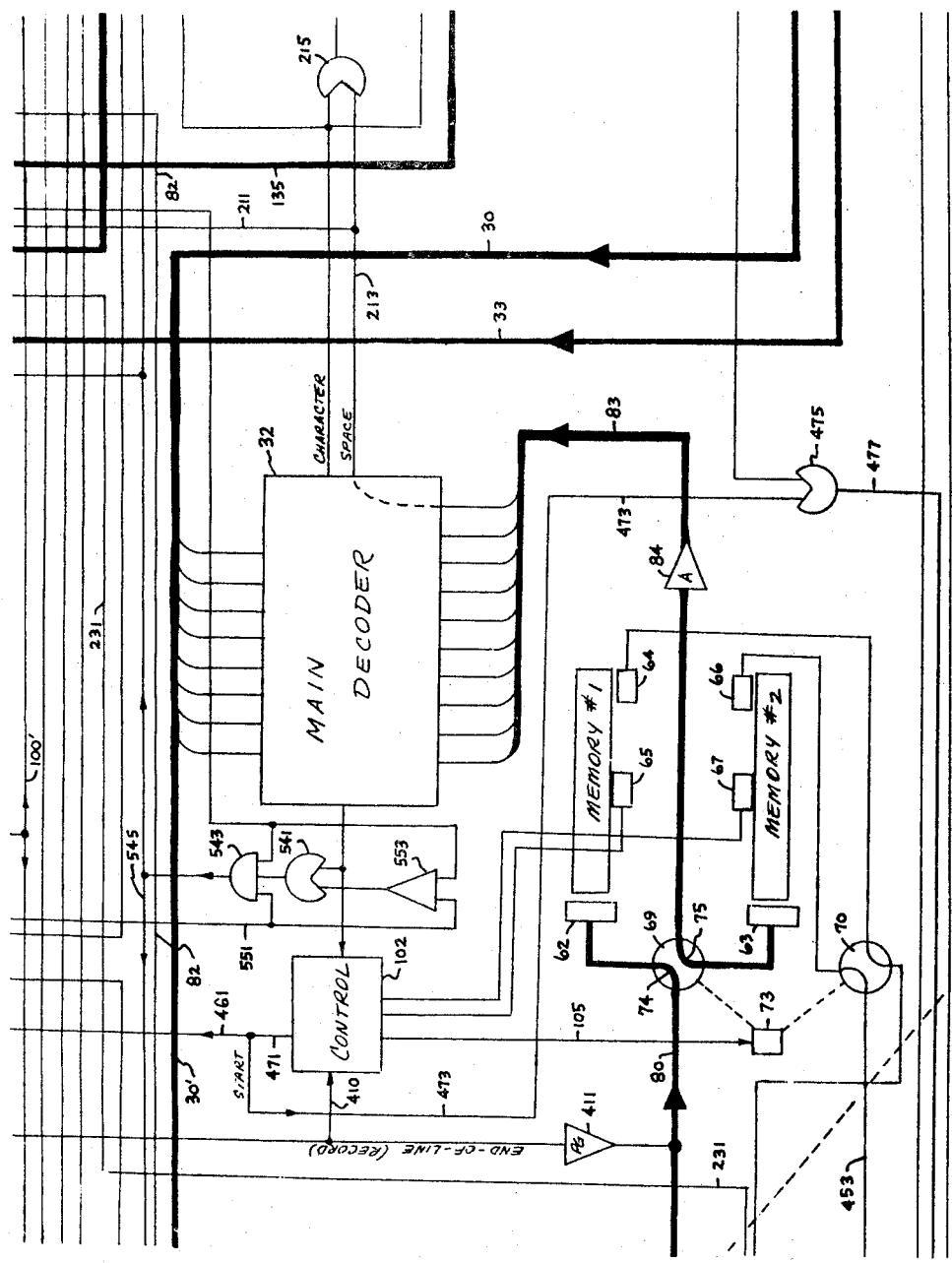
Figure 3:
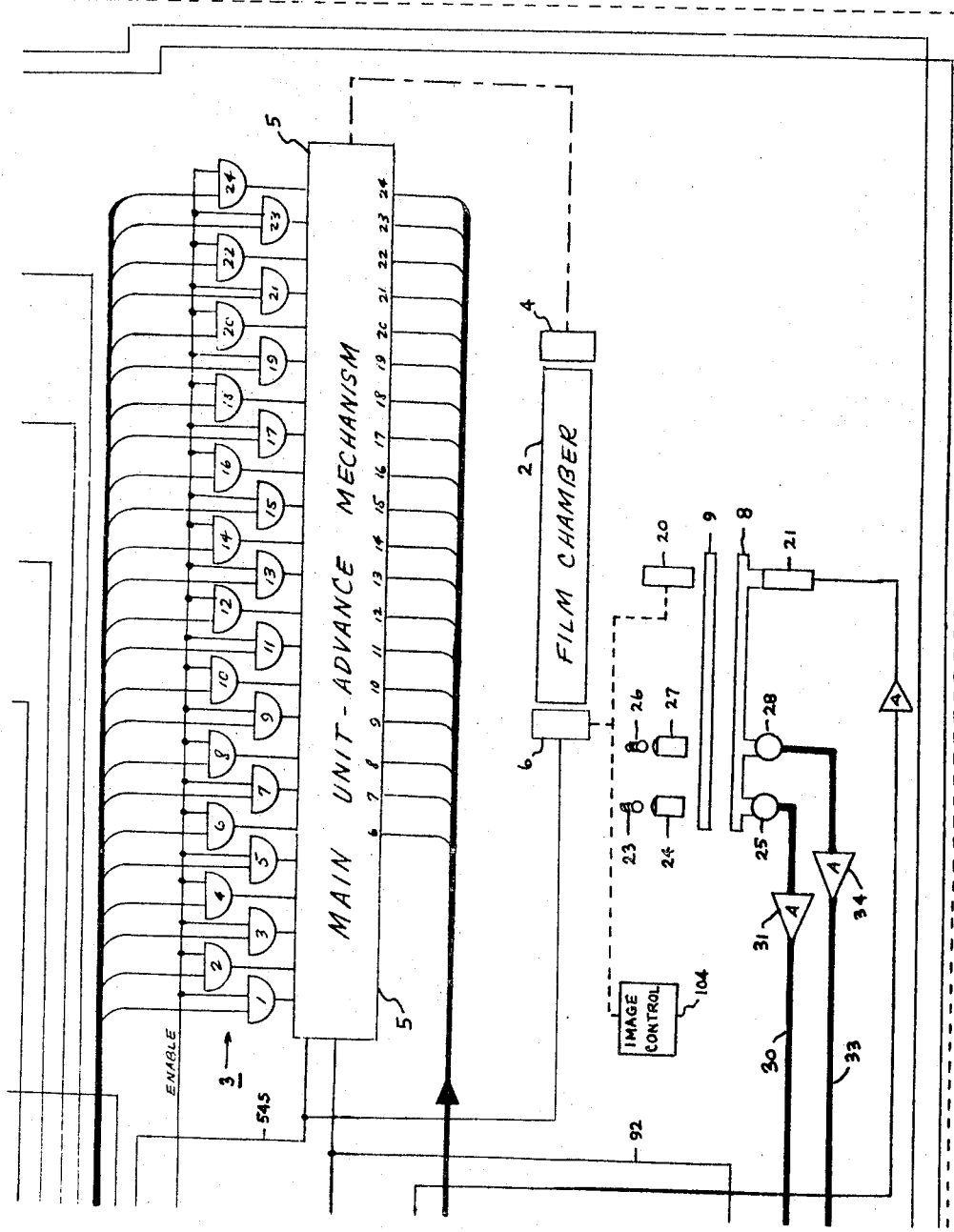
Figure 4:
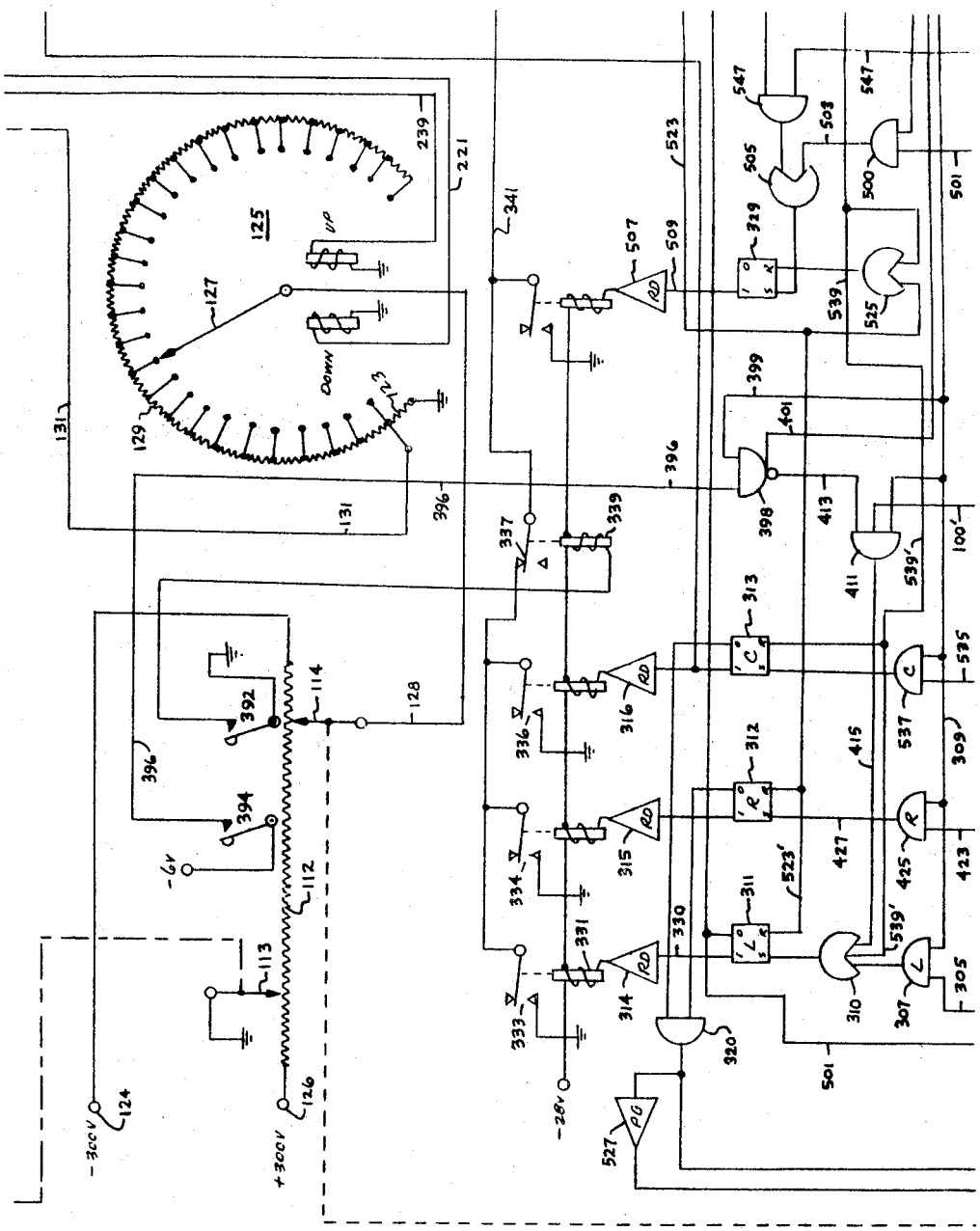
Figure 5:
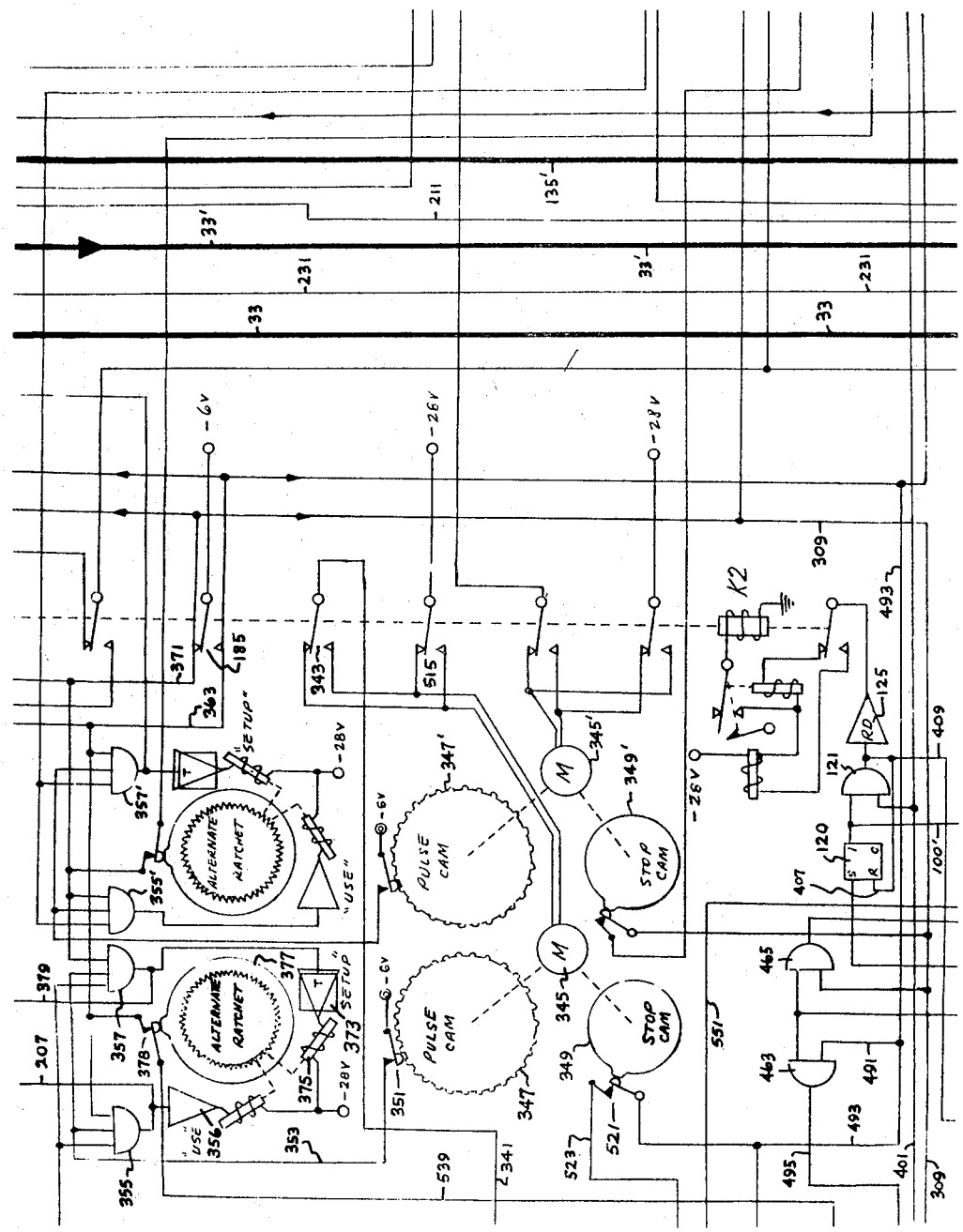
Figure 6:
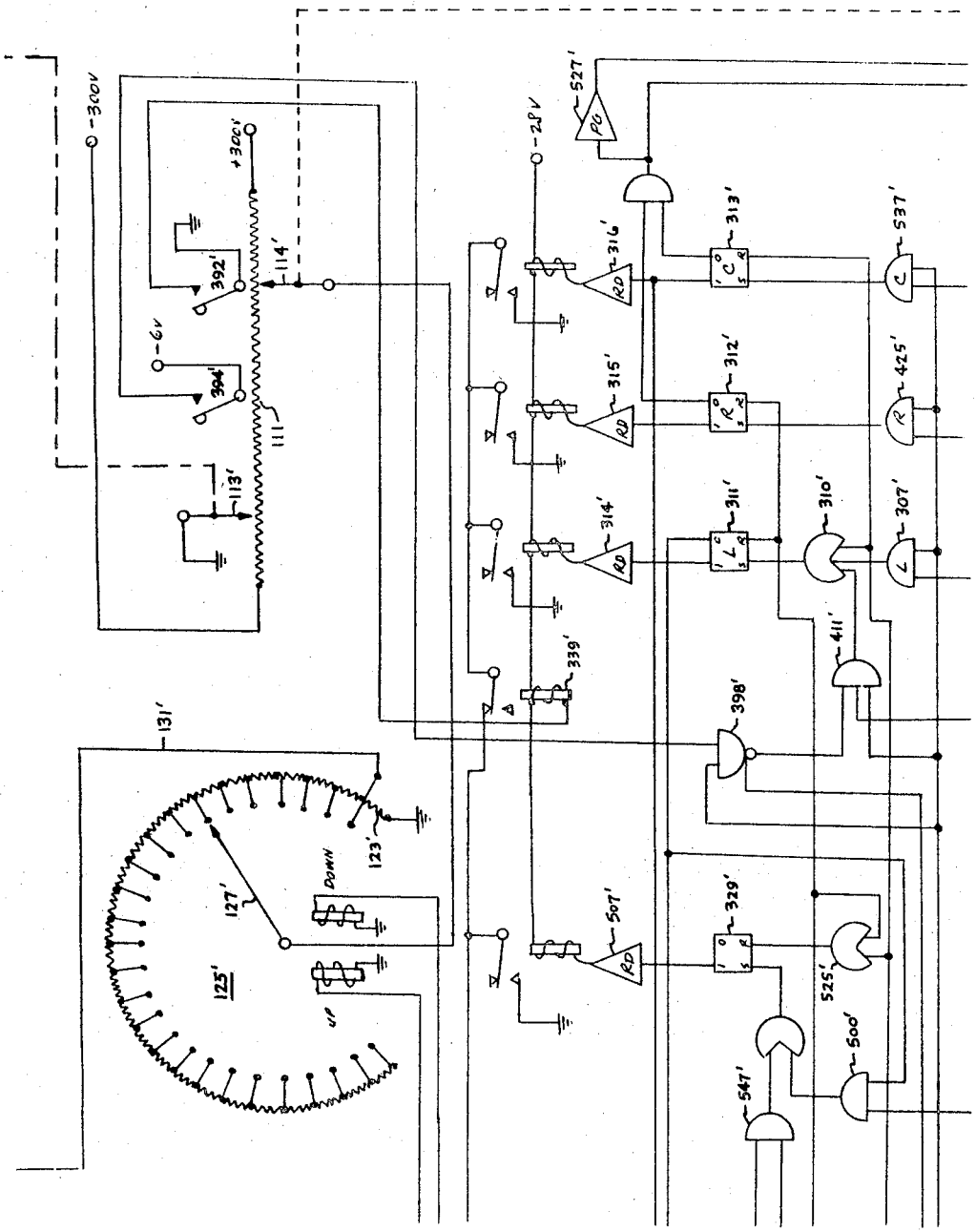
Figure 7:
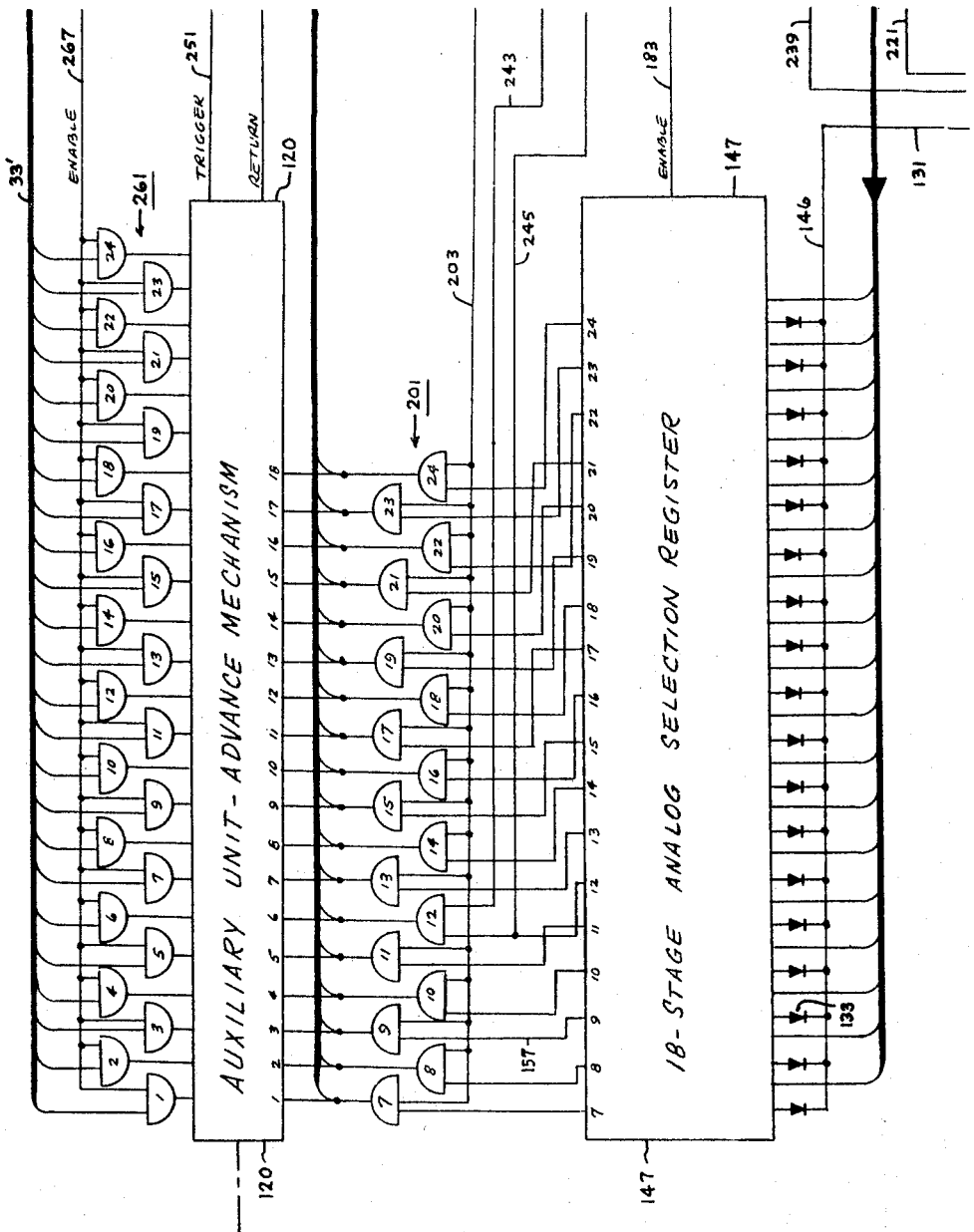

Referring now to the drawing, and particularly to the assembled or composite drawing made up of FIGS. 1–9, it will first be noted that the composite of FIGS. 4 and 7 are identical to the composite of FIGS. 6 and 9, and therefore the description will be limited only to two of these four sheets, with it being understood that the operation of the identical circuitry associated with the other memory section is identical to the operation described.

Figure 1:
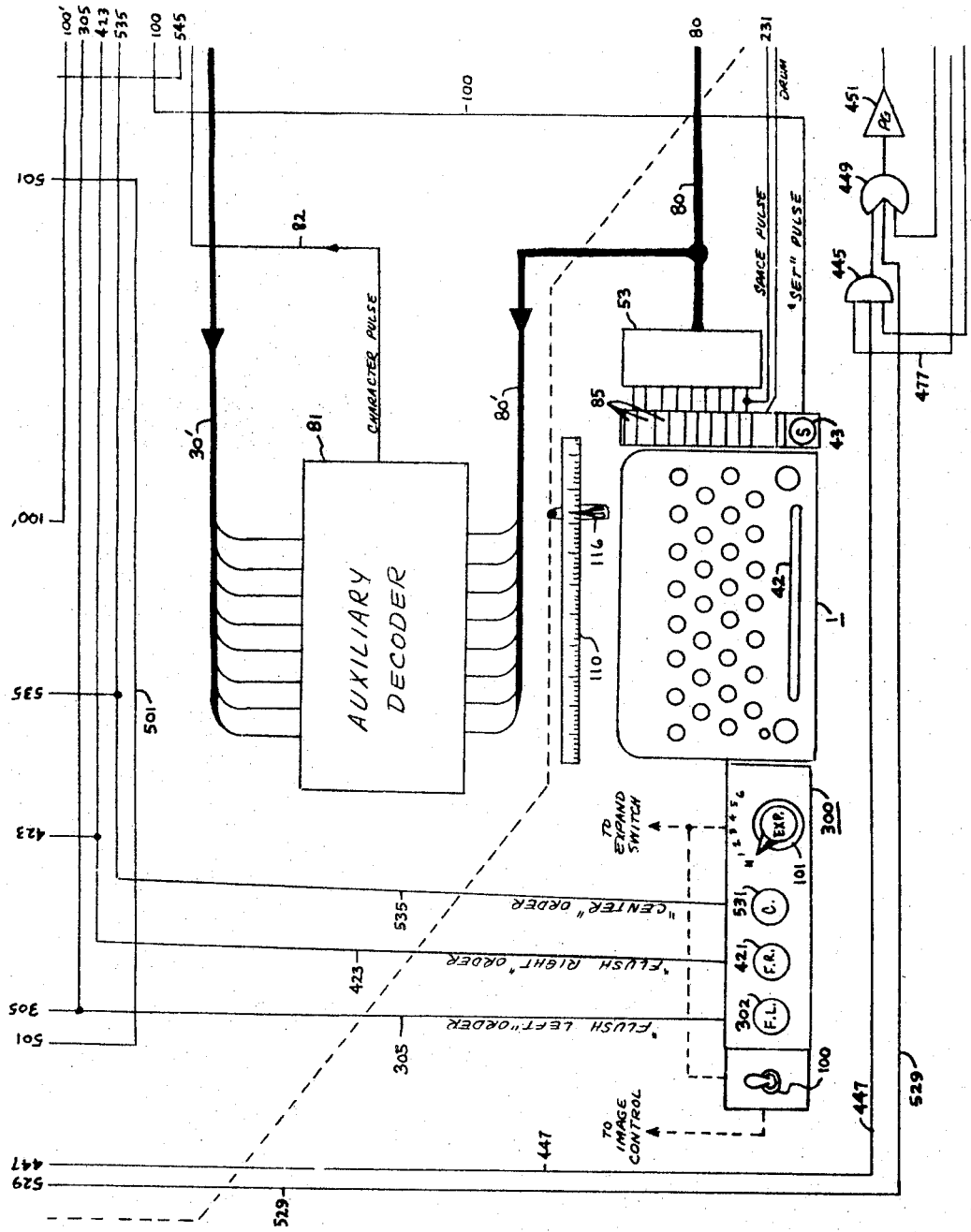

In FIG. 1 there is shown a typical input device for the present invention comprising the keyboard 1 which is substantially identical to an ordinary typewriter keyboard, but includes a few additional special purpose keys. It has been pointed out that the keyboard serves as the source for character codes for characters selected by the operator. Obviously, a tape reader or other well-known input mechanism could be substituted for the keyboard 1 within the principles of the invention to supply composition for justification.

In any event, the characters selected at keyboard 1 are adapted to be photographed onto a film or other medium contained in film chamber or holder 2 (FIG. 3). In the particular form of the invention illustrated, the film chamber or holder 2 is adapted for both lateral and vertical movement of the film in order to provide relative displacement between the film medium and the photographing means for composing each line sequentially in line-by-line fashion. The details of this arrangement are disclosed in the referenced, co-pending application, Ser. No. 220,836. It will suffice for purposes of this invention to know that a servo mechanism 4 under the control of main unit advance mechanism 5 is adapted to intermittently advance the film in the chamber 2 laterally in accordance with spacing allotted to the characters photographed. A servo mechanism 6, responsive to an end-of-line (return) signal from the memory (FIG. 2) returns the film laterally to its start position and elevates it vertically in preparation for the next line of composition.

It is to be noted here that the above-described method of effecting relative movement between the photographic medium and the image projecting means is only one of various practical techniques, and that the mechanization of the invention is not limited to the described method only, but may employ a movable right-angle prism or other diffraction means to effect such relative movement.

A source of character images as well as character codes and spacing codes for each is provided in the form of a rotary disk 9 (FIG. 3) adapted for continuous revolution at a speed of, for example, 300 r.p.m. As also clearly explained in detail in the referenced application, the disk 9 includes annular tracks apertured in accordance with, respectively, a character code for each character image, and a spacing code in association therewith. The character images carried by disk 9 are adapted to be photographed onto the film in film chamber 2 when at the projection window (not shown) by virtue of a light source 21 of the xenon type, which is momentarily flashed by a control pulse, fixed by the mounting 8; through photographic lens assembly 20. The stationary member 8 may comprise a mask or simply a mounting structure for the light responsive devices such as the photocells 25 and 28, respectively providing character code pulses and spacing pulses.

A light source 23 is adapted to project light by the lens system 24 onto the group of character code photocells 25 in discrete beams which pass through the code apertures of the rotating disk 9 to generate a group of code pulses for each character code. Simultaneously the continuous light source 26 is directing light beams, by way of the lens system 27, through each of the spacing code apertures (not shown) in rotating disk 9 to develop a single bit spacing code in association with each character code. Thus it is apparent that the rotating disk 9 continuously makes available in sequential fashion character codes and spacing codes representative of each and every character to be used in the system. Also, the rotating disk 9 serves to photograph images of the selected characters under proper control onto the film in film chamber 2 during the readout cycle.

The character code pulses are applied through a cable 30 (8 leads) and amplifier 31 to a main comparator decoder 32 (FIG. 2), being continuously available there; and the character spacing code pulses are applied through cable 33 (18 leads) and amplifier 34 to the main unit advance mechanism 5 and the auxiliary advance mechanisms 120 and 120', by way of the expand switch 29, section 1 (FIG. 8), and further cable 33' to the AND matrices generally illustrated at 3 in FIG. 3 serving as the immediate selecting input to the main unit advance mechanism 5, and at 261 and 261' (FIGS. 7 and 9) for the auxiliary advancing mechanisms 120 and 120'. It is significant that the spacing code for a character being photographed is applied directly to the main unit advance mechanism through the circuitry described from the rotating disk 9; whereas, the character code occurring simultaneously with the effective spacing code is coming from the memory No. 2 (FIG. 2) during the readout cycle, having been previously stored there during the last record cycle.

The main comparator decoder 32 (FIG. 2) triggers the projection of a printing character from the rotating disk 9 onto the film in chamber 2 when a character code is set therein from the memory No. 2, and a match from the code is developed at the main decoder as a result of rotating disk 9. The main decoder 32 also controls the spacing allotted to such character by virtue of its character spacing code through selection of proper spacing increment or units of space at main unit advance mechanism 5, because it renders the selection effective at the same instant of time as the photographic match in the main decoder 32 between the code pulses coming from memory section No. 2 (FIG. 2) and the same code pulses coming from the rotating disk 9.

A keyboard 1 (FIG. 1) is provided with a plurality of keys, at least one for each character on the code disk 9, as well as a spacer bar 42, and a "set" or line termination key 43. The remaining portion of the keyboard is conventional to that of a typewriter. An auxiliary control console 300 adjacent the keyboard provides control keys for expand, flush left or right, and centering functions.

Each time a key is depressed for a selected character, it effects the generation of a plurality of pulses in the form of the particular code for the character selected. This may be achieved in any number of ways, but is facilitated through the provision of, for example, a plurality of micro switches connected to pulse generating means which permit multiple bits to be coincidentally developed to form the unique code for each character, as is more fully explained in the referenced application.

The selected character codes sequentially produced at the keyboard 1 by the combination micro switches 85 and amplifier 53 are applied over multiple cable 80 (8 leads) to memory No. 1 (FIG. 2) which is in the record condition or cycle as illustrated, memory section No. 2 being in the readout condition or cycle simultaneously therewith. The multiple leads in cable 80 enable the parallel recording of the multiple bits depicting each character code on a magnetic drum or the like in memory No. 1. Also simultaneously, the character code pulses initiated at keyboard 1 are applied over cable 80' (FIG. 1) to an auxiliary comparator decoder 81.

The auxiliary decoder 81 may comprise, in part, a plurality of flip flops, e.g. 8 flip flops arranged in parallel to receive and store the input selected character code. It will be appreciated that the character code pulses developed by rotating disk 9 (FIG. 3) and applied over cable 30 to the main decoder 32 (FIG. 2) are also applied over an extension 30' of cable 30 to the auxiliary decoder 81. Thus, the selected character codes stored in the flip flops (not shown) of auxiliary decoder 81 will be matched by one of the character codes produced over the parallel leads of cable 30' (8 leads).

The purpose of auxiliary decoder 81 is to initiate the justification operation by enabling the selecting out of the appropriate spacing for each selected character. Thus, each time a selected character code from keyboard 1 is placed in auxiliary decoder 81 a match occurs with one of the codes produced by rotating disk 9 to provide an output character pulse on lead 82. It is these output character pulses which enable that portion of the tabulation for totalling the charatcer spacing units. Thus, while the selected character codes are being recorded into memory No. 1 (FIG. 2), spacing tabulation is proceeding in the circuitry of FIGS. 4 or 7, in order that on the next cycle, namely readout for memory section No. 1, the words produced by the recorded characters may be justified as the line is photographically composed. The details of the memory unit including memory No. 1 and memory No. 2 will be briefly set forth although they are considered in detail in the referenced application.

Memory section No. 1 and memory section No. 2 may comprise a pair of similar magnetic drums each adapted to by intermittently advanced in step-by-step operation during its own record or readout cycle. A group of combination read-record heads is collectively and operatively associated with each drum or memory section as illustrated at 62 and 63 (FIG. 2). The heads 62 and 63 as well as the drums comprising memory No. 1 and memory No. 2 are adapted to be alternately connected first to the amplifier 53 associated with the keyboard 1 (FIG. 1) and then to the main decoder 32, each connection maintained for one read or record cycle such that the cycles alternate for each memory section or drum. Thus after one of the drums (memory sections) has received character code signals for a line of copy recorded thereon, it is disconnected from the amplifier 53 (cable 80) and connected to the main decoder 32, being returned to initial position for readout, and simultaneously therewith the other of the drums or memory sections is disconnected from the main decoder 32 and connected to the amplifier 53, also being returned to the initial position preparatory to recording. Thus, the mode of operation permits the recording of character code signals for one line of copy on one of the drums simultaneously with the reading out of the character code signals stored on the other drum, representative of another line of copy which had previously been composed.

The intermittent advancing mechanism for memory section No. 1 is illustrated by the block 64. The memory section No. 1 is returned to the initial position after each of the recording and readout cycles by re-set servo 65. Similar provisions are made for memory section No. 2 in the advancing mechanism 66 and servo return 67.

The sequential operation of the memory sections No. 1 and No. 2 is controlled by a switching mechanism comprising the inter-connected similar units 69 and 70, each of which is adapted to switch all the memory connections from input arrangement to output arrangement or vice versa, by a control signal applied over lead 105, from the control circuit 102.

In the position shown, the recording heads 62 for memory section No. 1 (FIG. 2) are connected to the keyboard over cable 80 and the readout heads 63 for memory section No. 2 (FIG. 2) are connected via bridge 75 of switch unit 69, amplifier 84 and cable 83 to the main decoder 32. Rotation of the unit 69 by a quarter turn reverses the connections established by bridges 74 and 75 to connect memory section No. 1 to the main decoder for readout and memory section No. 2 to the keyboard for record. It will be appreciated that this switching arrangement is shown schematically and in fact may be carried through relay contacts or other well-known means. Also, preferably, the control indicated by servo 73 can be derived directly from the main switch under control shown as the relay K2, in FIG. 5, to be described in detail hereinafter.

Switching unit 70 operates in the manner of that explained in connection with switching unit 69 except that it controls inter-connection of the advancing mechanisms 64 and 66 for the respective memory sections.

It may thus be appreciated that with provision for justification the subject invention may be viewed as a "double match" controlled arrangement which eliminates the usual clock and other sync-generators normally employed to control the operation of other automatic systems. The first time character codes are matched occurs during the record cycle when the character code from the keyboard 1 (FIG. 1) is matched by a character code from the disk 9 (FIG. 3) to tabulate the character spacing. Also, of course, the character code from the keyboard is stored in the recording memory section. This operation is under control of the auxiliary decoder 81 (FIG. 1) which may be regarded as the record decoder, because it functions only during the record cycle for each memory section.

The second match occurs during the readout cycle when the stored character code is matched by a character code from the disk 9 (FIG. 3) to photograph the character and translate the film in film chamber 2 (FIG. 3). This operation is under control of the main decoder 32 (FIG. 2) which may be regarded as the readout decoder.

With the foregoing broadly in mind, next the details of the justification calculations and controls will be described. For justification each line of copy typed on the keyboard 1 (FIG. 1) for projection onto the film in film chamber 2 (FIG. 3) must extend from end to end of a predetermined length of space on the film in the film chamber 2. This predetermined length is set by the operator prior to the typing by manipulation of indicator 116 (FIG. 1) along control gauge 110. This slidable indicator 116 actually sets wiper contact 114 (FIG. 4) at a predetermined position along potentiometer 112. It should be pointed out at this time that in FIG. 6 similar structure is provided for control of the alternate cycle. This description will be concerned chiefly with the record cycle for memory section No. 1 (FIG. 2) with the spacing tabulation and computation arrangements primarily being disclosed in FIGS. 4 and 7. It should be borne in mind that precisely the same structure is provided in FIGS. 6 and 9 for operation with memory section No. 2 (FIG. 2) during its record cycle. Thus, the potentiometer 111 (FIG. 6) and associated circuitry functions in the manner to be described in connection with the potentiometer 112 in FIG. 4.

The justification circuitry actually tabulates the amount of spacing of the portion of line typed continuously up to the predetermined amount initially set by the operator, which amount of course determines the extent of the line of final copy in justified form. Thus, the initial source of information as to how much space operator has left, to be filled, at the end of the typed line of copy, in order for that line to extend to the required length, is converted to a respective voltage difference (that portion of the voltage across potentiometer 112 appearing between wipers 113 and 114 [FIG. 4]).

Wiper 113 is adapted to be incrementally advanced along the potentiometer 112 in the direction of wiper 114 through a mechanical inter-connection from auxiliary unit-advance mechanism 120 (FIG. 7); the counterpart to the advance mechanism is shown at 121 (FIG. 9). The function of the advance mechanism is to mechanically advance the wiper 113 in increments along potentiometer 112 in accordance with the spacing allotted to each character as well as to perform the same function for the between-word-spaces.

The potentiometer 112 is a linear device in which a portion of the entire resistance may be selectable to represent the entire spacing of a given line. This is possible by predetermining the position of wiper 114 at the right extremity of potentiometer 112 and initiating the operation of wiper 113 from the left hand of potentiometer 112.

Also, it should be noted that the two sliders (wipers) 113 and 114 may occupy the same electrical position along potentiometer 112, the result of which would be simply a grounding of wiper 114 to the slidable ground in connection with wiper 113.

There is 600 volts impressed across potentiometer 112 from negative 300 volt terminal 124 to +300 volt terminal 126; and, since the potentiometer is comprised of linear resistance, at any point along the potentiometer 112 a voltage may be selected with respect to, for example, negative and which will be directly proportional to the distance the selection point is from the negative end. Thus, half of the potentiometer would carry a voltage difference of 300 volts, and likewise, a quarter of the potentiometer would be represented by a potential of 150 volts.

As previously described, the depression of a key on keyboard 1 (FIG. 1) effects an advancement of slider 113 (FIG. 4) along potentiometer 112 by way of the advance mechanism 120 (FIG. 7) in accordance with the spacing allotted to the character selected. At the conclusion of the typed line therefore, it is intended that if the typed line has not utilized all of the total space predetermined by wiper 114 (FIG. 4) there will be a portion of potentiometer 112 picked out between sliders 113 and 114 and the voltage derived from this portion will be directly proportional to the remaining space in the predetermined line length, which is the remaining space required to fill the line to its justified length. Thus, this voltage is employed by the apparatus of the subject invention to control the main unit-advance mechanism 5 (FIG. 3) in establishing the between-word-spacing during the photographing of the characters of the justified line.

The portion of potentiometer voltage remaining between wipers 113 and 114 is impressed by conductor 128 for wiper 114 (FIG. 4) and ground for wiper 113 across that portion of the stepping switch resistance 129 (FIG. 4) defined by contact arm 127 and the ground terminal. Each resistor, such as resistor 123, between contacts of stepping switch 125, is equal in value. Therefore, the voltage between ground and contact arm 127 is equally divided among the equal resistors.

Contact arm 127 is positioned on contact 11 of stepping switch 125 and if it is assumed that 33 volts exist across the total of the 11 equal resistors such as 123, across each resistor will be impressed a potential of 3 volts. This is also true, of course, with respect to resistor 123 and thus it will be appreciated that $\frac{1}{11}$ of the stepping switch voltage is available at conductor 131.

Since the voltage remaining between wiper 113 and wiper 114 is that applied across the portion of stepping switch 125 selected by contact arm 127, it will be appreciated that the voltage across resistor 123 (3 volts) represents a quotient obtained by dividing the potentiometer portion voltage by the count represented in the stepping switch 125.

Stepping switch 125 is bi-directional, thus arranged to advance its contact arm 127 in accordance with pulses applied to its "step-up" or "step-down" solenoid, these pulses occurring when between-word spaces are being recorded (step-up) or read out (step-down).

The voltage that exists, therefore, on the first contact of the stepping switch 125 and thus on the associated take off lead 131 is representative of the electrical quotient derived by dividing the potentiometer remainder potential by the count in the stepping switch. This electrical quotient is applied via lead 131 to the selection bus 146 (FIG. 7), where it is available at the cathode terminals of 18 diodes, such as diode 133 (FIG. 7).

These diodes are the input points to the 18-stage analog-to-incremental selection register 147 (FIG. 7) which functions to convert the electrical quotient to some integral space-unit value for use by the main advance mechanism 5 (FIG. 3) during the readout cycle.

Referring now to the detailed circuits of FIGS. 10 and 11, the operation just described will be further clarified. The 3 volt quotient voltage from stepping switch 125 appearing on bus line 146 is applied to the cathode of all of the input diodes including diode 133. Diode 133 and all the diodes to the left (up to diode 133) will be caused to conduct by the quotient voltage. This is true because the anodes of each of the diodes are progressively biased at greater negative values as, for example, the lefthandmost diode may have a zero voltage applied to its anode with the next diode receiving a negative 1 volt, and diode 133 receiving a negative 2 volts. Thus, the negative 3 volts applied to the diode 133 from bus 146 will cause conduction of these three diodes. The next diode to the right (above diode 133) will be in a non-conductive or neutral condition, because its anode and cathode will be at the same potential, and all diodes further ascending to the right will be back-biased progressively greater, and hence will also be *non*-conducting.

The selection register 147 (FIG. 7) includes identical stages 7–24 (other than the anode potential distribution just described) which stages include for diode 133 (FIG. 10) a NAND-gate 151, a flip flop 153, and an AND-gate 155. Lead 157 is the No. 9 output lead for this stage of the register 147, as is also apparent from FIG. 7. Similarly, the other leads correspond to the numbers from 7–24 appearing on the register block 147.

Resistance voltage divider action is employed to supply the anodes of the diodes, such as 133, with the distinct, progressively different voltages. The distribution is changeable at the option of the operator to provide the expand function for increasing all spacing a uniform amount, as carried out by the expand switch 29 (FIGS. 8 and 10) under control of the selection made by the operator at expand knob 101 (FIG. 1) which is settable over a range of from zero to six. A zero setting, of course, eliminates the expand function, and a setting of 1–6 operates to add 1–6 space increments to each character advance operation.

The expand function is essential to enable use of the invention's full range of operational flexibility, by providing two important capabilities. One, the ability to letter-space, i.e.; to provide additional spacing between individual letters at the discretion of the operator according to demands of the nature of copy being set; and two, to enable the invention to utilize only one disk, such as the disk 9, for each type style, changing size of the characters only by altering the optical focussing of the photographic lens system 20 (FIG. 3). Inasmuch as increasing the size of the projected images on film will increase the space allotted to each individual character, both horizontally and vertically, the expand capability is utilized to automatically compensate by proportionately increasing the spacing advance performed by the main advance mechanism 5 and the vertical elevation of the film, line-by-line as controlled by the servo 6.

At the option of the operator, changing the size of the photographic image (known as "changing point size" in printing vernacular) is effected by first pushing the image control switch 100 (FIG. 1) to the "on" position, thereby linking the control of the expand switch knob 101 to also affect the image control unit 104 (FIG. 3). With this interconnection in effect, changing of the expand switch knob 101 will not only operate the expand switch 29 (FIG. 8) but will also render the image control unit 104 (FIG. 3) operative to modify the focussing of the lens system 20 and the vertical increment performed by the elevation and return control 6.

By this action, the image photographed to film is enlarged to any size determined by the operator, and the related additional spacing requirements are also automatically provided.

An additional feature of this unique arrangement lies in the fact that larger point sizes may also be letterspaced, as illustrated by the following sequences: The operator pushes the image control switch 100 (FIG. 1) to the "on" position; he then advances the expand knob 101 to the "add 2" position, for example, which switches the expand switch 29 (FIG. 8) 2 positions and simultaneously causes the image control unit 104 (FIG. 3) to modify the lens system 20 and vertical control 6 for an increased point-size projection of the characters on film; the image control switch 100 is then switched "off," leaving the lens system at that position; and lastly, the expand knob 101 is further increased to, for example, the "add 4" position. This increases the spacing allotted to each character, but now does not further cause any change in the lens system 20, nor elevation control 6, the image control 104 having been disconnected when the expand knob was at the "add 2" position.

Thus, within the limits of the design, any character point-size may originate from the same disk, such as disk 9, with spacing needs controlled therewith, and the additional feature of letterspacing may be performed at any stage of character size expansion.

The expand function is carried out by changing the voltage distribution on the anodes of the diodes, such as 133 (FIG. 10), through the provision of a multiple layer switch herein illustrated by the layer K and portion of the layer L. The voltage distribution circuit for the anode of diode 133 includes the voltage divider resistor 161 (which is referenced to ground at one end) connected over lead 163 and thence via horizontal lead 165 and vertical lead 167 to contact No. 3 of the conducting wafer segment 169 from a portion of wafer L. The circuit is continued through segment 169 and bias resistor No. 3 (for the third stage) to −28 volt bus 171.

In FIG. 11, the voltage divider action is clearly illustrated wherein the −28 volts are distributed between resistors 161 and 3, in proportion to their resistance to determine the anode potential at point C for diode 133. The value of each of the biasing resistors (FIG. 10), such as 1 for Stage 1, 2 for Stage 2, 3 for Stage 3, etc., is different so as to establish the progressive distinct different potentials available for the diodes, such as 133.

As the expand knob 101 (FIG. 1) is set to position 1, the connection for diode 133 (FIG. 10) will be altered from wafer L to the right hand conducting segment 173 of wafer K. This path is defined by the anode conductor 163, the horizontal conductor 165, and a vertical conductor 175 which leads to position 3 of the K wafer segment 173. Thus, had the knob 101 of FIG. 1 been turned to the "1" position, the conductive segment 173 of wafer K would complete the path from lead 175 over biasing resistor lead 179 to biasing resistor No. 2 (originally connected to Stage 2 in the non-expand condition). Thus, the action of selecting one unit of expansion results in a shifting of the biasing resistors in the same direction relative to the row of diodes, such as 133, to change each anode level to that which was previously associated with the diode to its immediate left. In this manner, the voltage distribution pattern can be changed at the option of the operator to provide the selected expand addition.

The anolog-to-incremental selection register 147 (FIG. 7) provides the function of converting the voltage quotient appearing on selection bus 146 into an incremental signal represented as an output from its appropriate stage, numbered 7–24 (FIG. 7). The manner in which this selection is accomplished is also apparent from the detailed showing of FIG. 10. When diode 133 is caused to conduct by the quotient voltage applied to bus 146, the NAND-gate 151 is partially enabled by such input. The other input to the NAND-gate 151 via lead 181 was previously enabled as a result of the output from AND-gate 156, which in turn was fully enabled by the ascending arrangement, etc. The enabling source for the row of AND-gates, such as 155, is via lead 183 (FIG. 7) which extends through contacts 185 (FIG. 5), providing a −6 volt enabling source, which enables the highest stage (Stage 24) in the register, which in turn enables the next successively lower stage, etc. The other input to the AND-gates, such as 155, is derived from its own associated flip-flop, such as 153, over a lead, such as 189, responsive to the "off" condition. Thus, AND-gate 155 can not enable the next successively lower gate because its flip flop 153 is turned on, thereby removing the enabling potential from lead 189. Since this action disables all stages below the No. 9 output, in the instant example, and since only flip flop 153 is in the "1" stage, Stage 3 will be the only stage to provide an output, which appears on lead 157.

It is this signal which is applied from lead 157 (FIG. 7) via cable 135 and 135' (FIG. 8) to the No. 9 terminal of the main unit-advance mechanism 5 (FIG. 3) to cause the addition of three spacing units to the nominal between-word spacing for justification purposes.

This output signal is only available to influence the spacing during the succeeding readout cycle when the stored characters and between-word-space signals of memory section No. 1 (FIG. 2) are being transferred to the film in chamber 2 (FIG. 3). A further AND-gate matrix 201 (FIG. 7) is interposed in the leads, such as 157, to insure that the justification control is exercised only during the advancement of an inter-word space. The AND-gates in matrix 201 are numbered from 7 to 24 to correspond with the stages of the anolog register 147. Thus, lead 157 applies the output from Stage 3 to an AND-gate No. 9 in matrix 201. This gate is enabled by the main space pulse applied to its input lead over leads 203 and 205, lead 207, contacts 209 (FIG. 8), lead 211 (FIGS. 5 and 8), and lead 213 (FIG. 2), which is continued as shown by the dotted line straight through main decoder 32 to cable 83 (FIG. 2), and available directly from the storage of memory section No. 1 during its readout cycle.

The other function of the output of selection register 147 (FIG. 7) is to provide an incremental enabling level to auxiliary advance mechanism 120 (FIG. 7) to further advance slider 113 (FIG. 4) along potentiometer 112 (FIG. 4) a distance equivalent to the incremental units of space just added for justification. This is also effected by gate No. 9, which was enabled over lead 157 through a further output extending to stage No. 3 of the auxiliary unit-advance mechanism 120. It should be apparent that the amount of justification was three spacing units, and it is this amount which is mechanically set along potentiometer 112 to reduce the divided remainder; whereas, the justification signal from the register 120 effected a nine unit advance at mechanism 5 (FIG. 9), because this included the nominal six unit inter-word spacing.

The divisor or count for stepping switch 125 (FIG. 4) is also effected from the between-word-spacing signal. Essentially, the same path is established from memory section No. 1 (FIG. 2) over cable 83 (during readout) and via direct leads 213, 211 (FIG. 5), switch contacts 209 (FIG. 8), lead 207 and branch lead 221 (FIG. 4) for reducing the count of stepping switch 125 commensurate with the justification added into the inter-word spacings at the photographed composition. Thus, the stepping switch 125 reduces the count one increment through movement of the contact arm 127 in the counter-clockwise direction for each inter-word space utilized in the readout process.

Of course, the justification process and the reduction of the count on stepping switch 125 occurs during the readout or next cycle for the memory section No. 1 (FIG. 2).

Figure 8:
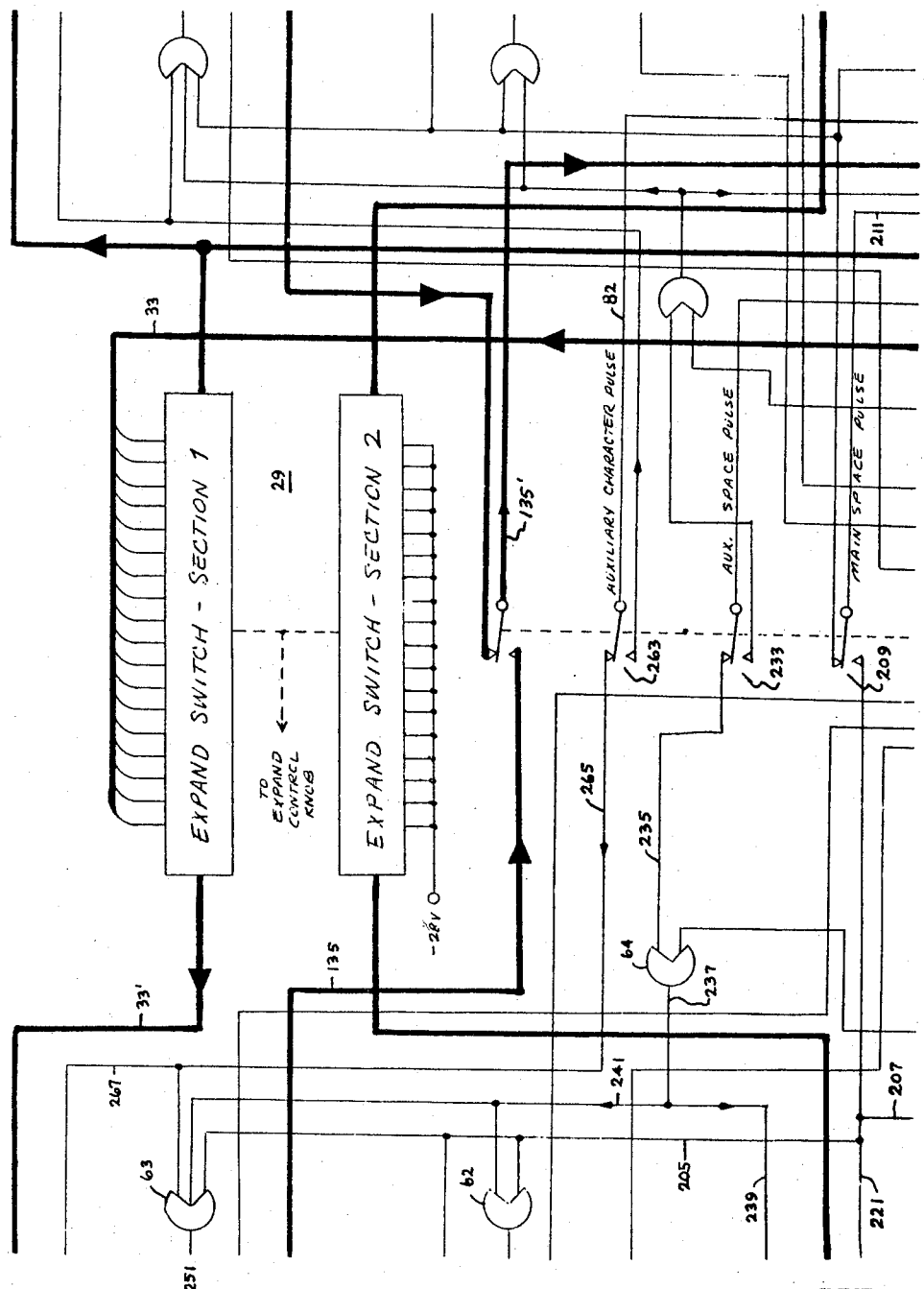

The stepping switch 125 was caused to count during the record cycle for memory section No. 1 directly from the space pulses developed through use of the spacer bar 42 on keyboard 1 (FIG. 1). The space pulse path is from the keyboard over lead 231 (FIGS. 1 and 2) and over contacts 233 (FIG. 8), further lead 235 and OR-gate 64 (FIG. 8). The output of the OR-gate is applied over lead 237 (FIG. 8) and the downward branch lead 239 (FIGS. 4 and 8) to the "up" coil for stepping switch 125. The other branch lead 241 (FIG. 7) from OR-input lead 237 extends to OR-gates 62 and 63 (FIG. 8). OR-gate 62 has an output over lead 243 which serves as one input to the AND-gate 12 of matrix 201. The other fixed input to the other side of AND-gate 12 is provided over lead 245 (FIGS. 7 and 8), contacts 185 (FIG. 5) and the negative 6 volt enabling source. Thus, AND-gate 12 of matrix 201, during record, is the only gate enabled in this matrix, and it is effective to select stage 6 of the auxiliary advance mechanism 120 (FIG. 7), which advances the slider 113 along potentiometer 112 the six units of distance representative of a nominal between-word space.

The other OR-gate 63 (FIG. 8) energized over lead 241 provides a trigger pulse over its output lead 251 (FIG. 7) which causes the auxiliary unit-advance mechanism 120 to advance the wiper 113 the nominal between-word spacing of six units, as determined by AND-gate 12 of matrix 201.

The AND-gate matrix 201 determines the magnitude of advance which the auxiliary advance mechanism 120 may supply when it is triggered. A similar matrix 261 provides the same function, but serves to select the independent spacing advance for each character. It is this matrix which is controlled by the character pulses from the auxiliary decoder 81 (FIG. 1) applied to lead 82. Thus, for each character selected at the keyboard, an enabling pulse in the form of the character pulse is applied to lead 82, which extends across FIG. 2 and then vertically of FIG. 5, laterally of FIG. 8, and via switch contacts 263 and lead 265 to the enabling lead 267 for the matrix 261 (FIG. 7). The enabling pulse applied over lead 267 triggers one of the 24 AND-gates in matrix 261. The one which is triggered is determined by a signal developed at disk 9 (FIG. 3) by one of the spacing photocells 28 (FIG. 3). The cable 33 includes 18 leads connected respectively between the 18 photocells for the spacing rows of disk 9, and 18 of these 24 AND-gates in matrix 261 (FIG. 7). As has been previously pointed out, the expand switch 29 (FIG. 8) is disposed in cable 33 and thus the cable 33′ extending from the expand switch 29 includes 24 leads to accommodate the additional 6 expand function connections. It will thus be appreciated that either diode matrix 201 or 261 can set or determine the magnitude of advance to be supplied by advance mechanism 120 (FIG. 7) to wiper 113 when the advance mechanism 120 receives a triggering pulse over lead 251 as explained.

With the basic functional use description in mind, a feature of the invention will now be presented which permits the justification to cope with remainders of any value, yet disperse the justification additions as uniformly as possible throughout the several between-word-spaces by permitting fractional portions of a unit space to aggregate until the addition of an extra unit is indicated, which is achieved immediately during the following between-word-space justification. The justification circuitry disclosed herein automatically carries out this remainder distribution throughout the line, such as to space apart the fractionally created extra units of space. A simple example will next be presented to indicate this feature. Consider the following tabulation as including in the left hand column a typical remainder voltage that would appear between sliders 113 and 114 (FIG. 4) following the justified readout of each between-word-spacing. The central column indicates the count of between-word-spaces, and the right hand column is indicative of the quotient continuously being derived by the circuitry but taken immediately following the between-word-space justifications.

| Voltage space units | Count of between-word-spaces | Quotient in unit spaces |
| --- | --- | --- |
| 11 | 5 | 2⅕ |
| 9 | 4 | 1¼ |
| 7 | 3 | 2⅓ |
| 5 | 2 | 2½ |
| 2 | 1 | 2 |
| 0 | 0 | 0 |

In this example, the initial entry of 11 volts represented the remainder or voltage equivalent of the spaces to be justified in a sentence which included six words (5 interword spaces, as indicated in the central column). The initial entry in the quotient column is the division of 11÷5, to provide a 2⅕ unit quotient. Thus, the justification circuitry will add 2 space units to the first interword spacing justified. As previously described, the main space pulse from memory section No. 1 energizes the down coil by stepping switch 125 (FIG. 4) to reduce the count stored by contact arm 127 by one count. Simultaneously, the same pulse enables the advance mechanism 120 (FIG. 7) to move the wiper 113 two unit-spaces, thus reducing the remainder for justification. The circuitry automatically provides this feature because the incremental voltage level selection register 147 (FIG. 7) has one of its diodes, such as 133, conducting because of the direct connection (lead 131) to the voltage equivalent of the quotient. In the example tabulated herein, the initial quotient of 2⅕ actually energizes the diode to the left of diode 113, which is Stage 2 representing two units of space. Thus, the register 147, through an output lead for Stage 2, and the AND-gate No. 8 of matrix 201, maintains the auxiliary advance mechanism 120 in readiness to cause the wiper 113 to move two spaces to the right upon triggering by the between-word space pulse. Thus, the remainder voltage equivalent of the justification is reduced from 11 volts to 9 volts, as shown in the above tabulation, and the count stored in stepping switch 125 (FIG. 4) is reduced to 4, with the voltage automatically indicating a quotient of 2¼. The process is continued until the fractional quotient remainder exceeds ½ of a unit. In the circuit, this increase in quotient is sufficient to energize the next higher stage (in the present example, establishing conduction in diode 133 of the analog-incremental register 147) to cause the auxiliary advance mechanism 120 to move the wiper 113 three space units. This is reflected by the result that the justification voltage equivalent is reduced from 5 volts to 2 volts following readout of the next between-word-space. Therefore, at the conclusion of the justification process, the entire remainder has been inserted in the between-word-spaces substantially uniformly, effecting true justification.

In consideration of all of the basic requirements of a typographic composition device, it will be seen that not only the process of composition with justification is required, but also the additional flexibility is necessary to enable partial lines or single words to be positioned flushed to the left, flushed to the right, or centered. The method by which the subject invention accomplishes these functions will not be described. The flush left operation, being the most essential of the three and most often used in typographic composition, will first be described.

Upon completion of a paragraph, it is frequently necessary for the last line of a given composition to occupy much less than full predetermined length. When this requirement occurs, the operator, after having completed the composing of this partial line, depresses the flush left control 302 (FIG. 1) on the special control panel 300 located adjacent the keyboard 1 (FIG. 1). This action places an enabling voltage on lead 305 which enables the L AND-gate 307 (FIG. 4). If this circuit group is designated for the readout cycle as determined by the position switching relay K2 (FIG. 5), it will be seen that the aforementioned AND-gate 307 is also otherwise enabled from a common enabling bus 309 which receives —6 volts from contacts 185 (FIG. 5). Therefore, AND-gate 307 being fully enabled, applies its output through OR-gate 310 to the SET input of flip flop 311, thereby setting this flip flop to the "on" condition. The "on" output of the flip flop 311 is applied directly to relay driver 314 over lead 330 energizing its associated relay coil 331, closing its associated contacts 333. This action provides a ground through the contacts 333 over lead 335 through contacts 337 of de-energized relay coil 339, lead 341, contacts 343 (FIG. 5) to a drive motor 345.

The motor 345 drives two cams, a pulse cam 347 and a stop cam 349. As the pulse cam 347 begins to rotate, its lobes cause switch contacts 351 to make the break in rapid sequence a negative 6 volt biasing connection applied to lead 353. This voltage is applied to two AND-gates 355 and 357, partially enabling each. The AND-gates 355 and 357 are otherwise enabled over common lead 359 (FIGS. 5 and 6) and 359' (FIG. 6) by the "on" output of the flip flop 361, bearing the notation C. The AND-gates 355 and 357 are further enabled by a voltage from contacts 188 over lead 363 via contact 185 from the negative 6 volt biasing source.

Inspection of the inter-connections just described will show that only one of the AND-gates 355 and 357 will be completely enabled during any one cycle, i.e. AND-gate 355 being enabled only as the associated components are switched for readout purposes, and AND-gate 357 enabled only for use during the record or set-up cycle. This is as a result of contacts 185 applying the —6 volt biasing source to either lead 363 or 371, lead 363 extending to AND-gate 357, or lead 371 extending to AND-gate 355.

For purposes of illustration, consider that the voltages required for enabling are thus applied to AND-gate 357 during record of memory section No. 1 (FIG. 2). The resulting pulse output will be applied to relay driver 373, which is actually a triggered "flip flop" which will deliver one output only for every other pulse received.

Thus, the "set-up" coil 375 will advance the alternate ratchet cam 377 one position for every two pulses received. At the same time, the pulsed output of AND-gate 375 is further applied through lead 379, through OR-gate 64 (FIG. 8), to lead 237 (FIG. 8) over leads 239 and 241 which continuously perform the same function of up-dating the justification mechanism both in increments along the linear potentiometer and in counting of the stepping switch 125 (FIG. 4), as that performed by the auxiliary spacing pulse previously described.

From the foregoing description, it can now be seen that each pulse originating from the pulse cam contacts 351 creates a similar result as that created by the depressing of the spacer bar 42 on keyboard 1 (FIG. 1); or in other words, the same action is performed as if the operator were rapidly depressing the spacer bar. This action continues until slider 113 (FIG. 4) reaches a point along potentiometer 112 which is in proximity to slider 114, at which time it closes the contacts 392 energizing relay 339, breaking contacts 337, and thus rendering the motor 345 inoperative and completing the set up of the flush left operation. By this process, the justification circuits have been provided with sufficient spacing values and inter-spacing counts to then normally perform the justification process as hereinbefore described.

This "blank-spacing" process is reversed during the readout cycle, after all characters of the partial line or word have been photographed onto film, as follows.

At the conclusion of each readout cycle, the previously recorded end-of-line signal is the last pulse to emanate from the readout memory. This signal is applied through the OR-gate 541 to the AND-gate 543, the output of which is applied over lead 545 to the AND-gate 547 (FIG. 4). The AND-gate 547 is otherwise enabled from the 6 volt enabling bus 493 during its respective readout cycle and provides an output through OR-gate 505 to set the flip flop 329, close the contacts of relay 511, to energize the motor 345 (FIG. 5) and thereby initiate the pulse counting action hereinbefore described. This end-of-line pulse is necessary as a signal from the readout memory (which at this time is section No. 1 during its readout cycle) to indicate that all character images have been photographed sequentially to film, and that there remains only the task of returning the pulse cam to its starting position.

The invention provides an additional important feature associated with the flush left operation in that if the operator were to inadvertently depress the "set" or end-of-line key 43, (FIG. 1), without first depressing the flush left key 302 at a time when the flush left operation is necessary, the mechanism will nevertheless automatically perform the flush left operation. This automatic function is under control of cam-operated contacts 394 which are closed through the action of wiper 113, as it just reaches the conclusion point of its travel, opposite wiper 114. The distance along the potentiometer 112 represented between the location of the contacts 394 and the contacts 392 is a distance preset in manufacture, representative of the limits to which the mechanism would justify a line in reasonably acceptable manner. To further clarify, if advancement of wiper 113 had not yet reached this point during the composition of a line, initiation of the justification process could possibly result in an unacceptable justification. The normally acceptable position for the contacts 394 along potentiometer 112 is approximately ⅞ to ⁹⁄₁₀ of the predetermined line length. Thus, while the manufacturer normally fixes the position of contacts 394, both the contacts 392 and 394 are slidable with wiper 114, being physically attached thereto and reachable by wiper 113 in the same ordered sequence as illustrated in FIG. 4.

The enabling —6 voltage applied through contacts 394 on lead 396 partially enables NAND-gate 398 which is otherwise enabled from the common bus 309 over lead 399. The AND output of NAND-gate 398 is applied over lead 401 to AND-gate 121 (FIG. 5). Thus it will be seen that unless NAND-gate 398 is enabled, the dependent AND-gate 121 will not be fully enabled, and therefore, will not pass the set pulse output from flip flop 120 and the master switch-over control of relay K2 will not take place.

To further clarify the purpose of flip flop 120, it should be noted that its set input (s) is directly connected from set key 43 over lead 100 such that the flip flop is caused to produce an output to AND-gate 121 when the operator depresses the key signifying end of a given line. The ultimate purpose of the output of AND-gate 121 is to energize relay driver 125 to control the switch-over from record to readout cycle or readout to record cycle for respective memory sections, and all associated components as evidenced by relay contacts disposed on FIGS. 5 and 8 directly above the control relay coil K2. If a line has extended a sufficient distance toward its predetermined length so that the contacts 394 are in a closed condition, then NAND-gate 398 is fully enabled, its AND output successively enables AND-gate 121 and an "on" output from flip flop 120 ("1") produced by the set pulse will then cause relay driver 125 to be energized, completing the switching operation. Further, the output of AND-gate 121 immediately resets flip flop 120 over lead 407 and also provides an end-of-line pulse which is applied through leads 409 and 410 (FIG. 2) to control unit 102, and then via lead 105 to servo mechanism 75, (which reverses the record-readout cycle for memory section Nos. 1 and 2), and through a pulse generator 411 into the cable 80 to be recorded in memory section No. 1.

To further describe the automatic feature enabling the system to perform the flush left operation even when the operator prematurely depresses the set key 43, the set pulse is also applied over cable 100' to the input of AND-gate 411. AND-gate 411 is further enabled by the 6 volt enabling bus 309 and the NAND output on lead 413 of NAND-gate 398. Thus, at any such time that the contacts 394 have not yet been made, NAND-gate 398 will therefore be disabled, and its inverted output on lead 413 will be an enabling level to AND-gate 411. Thus, a set pulse while at this time not effective to cause the switch-over at the component group K2 (FIG. 5) will nevertheless be effective to fully enable AND-gate 411, so that its output may be directed over lead 415 through OR-gate 310 to set the flush left flip flop 311, and thus initiate the flush left process the same as if the flush left button had been depressed.

The foregoing has covered the flush left and the automatic flush left operations, and the following description will relate the flush right operation.

The flush right operation is initiated by the operator depressing the flush right key 421 (FIG. 1) for purposes of moving partial lines adjacent the right margin of a given predetermined line length, such as a letterhead address, numeric figure tabulation, and the like. Depression of the flush right key 421 activates lead 423 to enable the "right" AND-gate 425 (FIG. 4) that is otherwise enabled by the 6 volt enabling bus 309. This action provides an output from AND-gate 425 over lead 427 to set flip flop 312 to the "1" position, which in turn energizes relay driver 315 closing its associated relay contacts 334, providing from this point the same counting process by the cooperative action of pulse cam 347, motor 345, as hereinbefore described in connection with the flush left operation with the following exception: When the flush right flip flop 312 is set, its zero or "off" output is supplied over lead 441, disabling AND gate 320, the output of which now disables AND-gate 445 (FIG. 1) over lead 447 (FIG. 4). Disabling of AND-gate 445 prevents the generation of a normal "start" pulse which would be routed from the output of AND-gate 445 through OR-gate 449, pulse generator 451 and via lead 453 to the advancing mechanism (64 or 66) of the memory section to be read out. Control unit 102 initiates the normal "start" pulse following delay provided by the control unit 102 to allow the drums of each memory section, subsequent to the switching action of relay coil K2 which interchanges the record and readout functions for the memory sections, to return to their initial record and readout or starting positions. This "start" pulse must necessarily be present to initiate the readout process of the memory drum so designated. The "start" pulse is routed in two directions from control 102, the first of which follows conductors 471, 473, OR-gate 475 (FIG. 2), output lead 477 to the input of AND-gate 445 (FIG. 1). The other direction follows the path through conductor 461 to the inputs of AND-gates 463 and 465 (FIG. 5). Since AND-gate 445 (FIG. 1) is disabled upon actuation of a flush right function, the "start" pulse can only have effect upon one of the two AND-gates 463 or 465 (FIG. 5) only one of which is presently further enabled on its second input. Following the switch-over process involving relay coil K2 and all associated contacts, it will be seen that the second input will enable the AND-gate 463 to provide its output over 495 to the input of the AND-gate 500 (FIG. 4). It will be seen that the AND-gate 500 is already otherwise enabled by the "zero" output of the flush left flip flop 311 over lead 501. The resulting output of AND-gate 500 is applied over lead 503 through OR-gate 505 to the "set" input of the flip flop 329. When set to its "on" condition, the flip flop 329 energizes relay driver 507 over lead 509, which in turn closes the relay contacts 511, thereby connecting to ground the motor return bus 341.

It will be remembered that in the switching action performed by the relay coil K2, the energizing connection of voltage to motor 345 is now reversed by means of relay contacts 515. Thus, when the motor circuit is completed, it will operate in the opposite direction to that in which it operated during the "counting up" portion of the flush right function. The resulting pulses generated by the contacts 351 from the action of the pulse cam 347 are applied through the lead 353, AND-gate 355, lead 207 (FIG. 8), relay contacts 209, lead 211 (FIGS. 5 and 8) and lead 213 to the input of the OR-gate 215 (FIG. 2), the output of which initiates the advancement, by the main unit-advance mechanism 5 (FIG. 3), of the film in the film chamber 2 (FIG. 1). Thus, a nominal inter-word spacing advancement is affected at the film chamber 2 by each pulse generated by the action of the pulse cam 347 (FIG. 5). The foregoing action continues until such time that the stop cam 349 (FIG. 5) once again returns to its zero position energizing its associated contacts 521. The resulting voltage level is applied through lead 523 (FIG. 4) through OR-gate 525 to the reset input of the flip flop 329, thereby de-energizing the relay 511, breaking the motor drive circuit to motor 345 (FIG. 5), and halting the space pulsing action.

The output voltage from the closed contacts 521 of the stop cam 349 is also applied over lead 523 (FIG. 4) and 523' applying a reset pulse to both the flush left flip flop 311 and the flush right flip flop 312. The resetting of the flush right flip flop 312 provides an enabling level once again through lead 411 to AND-gate 330 (FIG. 4), its resulting output over lead 447 thus enabling AND-gate 445 (FIG. 1). The output of AND-gate 330 also simultaneously energizes pulse generator 527 which emits its output pulse over lead 529 through OR-gate 449, pulse generator 451, initiating the "start" pulse, which also was delayed until this time by the flush right operation. The resulting "start" pulse initiates the normal action of the memory connected for readout purposes and a normal readout process, as hereinbefore described, ensues.

The remaining feature to be described is the "center" function which is initiated by the operator by depressing the "center" key 531. The resultant level is applied over lead 535 to the "center" AND-gate 536, the output of which will set the "center" flip flop 313. The "1" output of flip flop 313 energizes the relay driver 316 closing the relay contacts 336 providing the ground source to the motor return bus 335, to complete the energizing circuit for the motor 345 (FIG. 5) as hereinbefore described.

At the same time, the setting of the "center" flip flop 313 disables the AND-gate 330 in the same manner as previously shown in relation to the flush right function, thus once again disabling the normal "start" pulse function. It has been shown that the pulse action of the contacts 351 (FIG. 5) resulting from the movement of the pulse cam 347 is effective to cause the stepping of the alternate ratchet cam 377, one step for every other pulse generated. When the master switching arrangement, as effected by the relay K2 (FIG. 5) has been completed and the motor 345 is connected to operate in its reverse direction, the reverse pulsing action of the pulse cam 347 is now applied to the fully enabled AND-gate 355. The output of the AND-gate 355 is now applied to the solenoid driver 356 which steps the alternate ratchet 377 in the reverse direction. However, in this application, the ratchet is stepped for every pulse generated, in contrast to its having been stepped during the set-up cycle (record cycle) by every other pulse. Thus, the alternate ratchet 377 is returned to its initial or starting position at half the number of pulses as that required to advance it originally, and therefore energizes its associated contacts 378 at a point when only half of the excess spaces have been utilized. The 6 volt level from the closed contacts 378 applied over lead 539 and 539' (FIG. 4) serves to reset the "center" flip flop 313 and set the flush left flip flop 311, thus initiating the flush left function at this point, wherein the system assumes the left hand margin to be at this point, reads out the stored character images on the film, then supplies the remaining "fill" spacings, to thus effect the centering process.

While the preferred embodiment of the invention is herein described, nevertheless other and further applications will occur to those skilled in the art from a reading of the detailed specification when viewed in light of the drawings. Therefore, it is intended that this invention be limited not by the specification, but rather by the appended claims, wherein what is claimed is:

1. In a phototypographic apparatus adapted for automatically compiling justified composition of selectable printing characters, in line by line fashion on a medium using voltage magnitudes to represent spacing units, the combination comprising a potentiometer adapted to be connected across a source of voltage and comprising a tap movable therealong in accordance with the spacing units of each character selected and the nominal between-word-spacings; a plurality of selectable equal value resistors connected in series with the number of selected resistors being used to represent the number of nominal between-word-spacings and the voltage magnitude across one of said resistors representing the spacing to be added to the nominal between-word-spacing for justification; means for selecting from said series of registers a number of resistors equal to the number of between-word-spacings in the line being compiled; means including said tap for connecting the selected resistors across the difference in potential between the desired line length and the compiled unjustified line length; means for utilizing the quotient from the division of said difference voltage by the number of selected resistors to augment the nominal between-word-spacing of the first between-word-spacing; means for reducing the number of selected resistors by one resistor for each augmentation and reducing the difference voltage substantially by the magnitude of voltage across one resistor to provide succeeding quotients for augmenting successively the nominal between-word-spacings to justify the line.

2. Automatic justification apparatus for phototypographic equipment which justifies lines of composition of selectable printing characters compiled in line by line fashion comprising, in combination a linear potentiometer across which a constant source of voltage is adapted to be imposed; a settable terminal contact settable along said potentiometer to represent the justified spacing of a desired line; a movable tap on said potentiometer for selecting units of voltage from said source corresponding to the spacing widths of the selected characters and the nominal between-word-spacings for a compiled unjustified line whereby the difference potential between said tap and said settable contact at the conclusion of compiling the unjustified line represents the amount of spacing to be substantially uniformly divided between the number of between-word-spacings for justification; a stepping switch comprising a plurality of equal value resistors and an arm for selecting a number of said resistors corresponding to the number of between-word-spacings in said unjustified line; electrical connections for connecting the selected number of resistors in parallel across the difference voltage between the adjustable tap and the settable contact by way of said arm; means selecting the voltage across one of said series of resistors as the spacing equivalent to be added to the first between-word spacing in compiling the justified line; and means for reducing the number of selected resistors by one after each between-word-spacing has been augmented and reducing the difference voltage the equivalent of the spacing used to augment the between-word-spacings to justify the line.

3. In a phototypographic apparatus adapted for automatically composing a justified photograph of selectable printing characters, in line-by-line composition, on a medium; comprising a source of constant potential; means to select from said source an accumulated voltage value equivalent to spacing units in measures of electrical potential corresponding to each character selected and a common value in electrical potential for each nominal between-word-spacing; settable means to preselect from said source a total electrical potential to represent the additive electrical potential of all selected characters and between-word-spacings to comprise a desired justified line such that the total voltage less the accumulated voltage comprises a difference voltage; a plurality of equal value voltage dropping elements electrically interconnected; means for selecting a number of said elements corresponding to the number of between-word-spacings used in composing a line of the selected characters as each between-word-spacing is used; means connecting the selected elements across the difference voltage; means responsive to the voltage across one of said selected elements to provide a quotient, as a quantity of electrical potential, for controlling the relative spacing movement between the medium and the characters being photographed thereon by expanding the first between-word-spacing an amount equivalent to the value of the quotient and reducing the difference voltage by the voltage magnitude used to expand said between-word-spacing; means to eliminate one element from said series for each between-word-spacing whereby a further quotient is developed for each between-word-spacing to control said relative movement and to reduce said difference voltage.

4. The apparatus of claim 3 wherein said means to select from said source comprises a linear potentiometer; and said elements comprise precision resistors.

5. The apparatus of claim 3 wherein said spacing values are measured in units and further comprising means responsive to the quotients to select the equivalent spacing value to the nearest unit.

6. A phototypographic apparatus adapted for automatically compiling justified composition of selectable printing characters comprising in combination a plurality of equal value resistors electrically interconnected with each resistor representing one nominal between-word-space, means for selecting a number of said resistors equal to the number of nominal between-word-spaces; means establishing a magnitude of electrical potential representative of the spacing of a desired line length; means for establishing a measure of electrical potential equivalent to the spacing of selected characters and nominal between-word-spacings in an unjustified line; means for applying the difference between said magnitude and measure across the selected resistors; means to select the voltage across one of said resistor to be used as a first quotient for expanding the first nominal between-word-spacing and correspondingly decreasing the difference voltage; means reducing the number of selected resistors by one resistor when said first quotient is utilized to provide a second quotient measured across the resistor used for the first quotient whereby the line is justified by successive quotients so-developed for each of the nominal between-word-spacings.

References Cited

UNITED STATES PATENTS

| 2,229,689 | 1/1941 | Westover | 95—4.5 |
| 2,682,814 | 7/1954 | Higonnet | 95—4.5 |
| 2,714,843 | 8/1955 | Hooven | 95—4.5 |
| 2,786,400 | 3/1957 | Peery | 95—4.5 |
| 2,847,919 | 8/1958 | Rossetto | 95—4.5 |
| 3,083,624 | 4/1963 | Troup | 95—4.5 |

JOHN M. HORAN, *Primary Examiner.*